US012763252B2

(12) United States Patent
Yamane

(10) Patent No.: US 12,763,252 B2
(45) Date of Patent: Oct. 13, 2026

(54) CAPACITOR UNIT AND POWER CONVERSION DEVICE

(71) Applicant: TMEIC Corporation, Tokyo (JP)

(72) Inventor: Keishi Yamane, Chuo-ku (JP)

(73) Assignee: TMEIC CORPORATION, Tokyo (JP)

( * ) Notice: Subject to any disclaimer, the term of this patent is extended or adjusted under 35 U.S.C. 154(b) by 181 days.

(21) Appl. No.: 18/851,384

(22) PCT Filed: Feb. 28, 2023

(86) PCT No.: PCT/JP2023/007371

§ 371 (c)(1),
(2) Date: Sep. 26, 2024

(87) PCT Pub. No.: WO2024/180674

PCT Pub. Date: Sep. 6, 2024

(65) Prior Publication Data

US 2025/0182964 A1 Jun. 5, 2025

(51) Int. Cl.
*H01G 2/10* (2006.01)
*H01G 2/04* (2006.01)

(52) U.S. Cl.
CPC ............... *H01G 2/04* (2013.01); *H01G 2/106* (2013.01)

(58) Field of Classification Search
CPC ............ H01G 2/04; H01G 2/106; H01G 2/10; H01G 4/224; H01G 4/38; H01G 2/02
USPC ......................... 361/759, 752–753, 807–810
See application file for complete search history.

(56) References Cited

U.S. PATENT DOCUMENTS

| | | | | |
|---|---|---|---|---|
| 10,707,768 | B2 * | 7/2020 | Voegeli | H05K 5/0217 |
| 12,062,489 | B2 * | 8/2024 | Hock | H01G 11/18 |
| 12,089,358 | B2 * | 9/2024 | Yamane | H02M 7/003 |
| 2023/0020139 | A1 | 1/2023 | Yamane | |

FOREIGN PATENT DOCUMENTS

| | | |
|---|---|---|
| JP | 2006-173417 A | 6/2006 |

OTHER PUBLICATIONS

International Search Report issued May 16, 2023 in PCT/JP2023/007371, filed on Feb. 28, 2023, 3 pages.
Office Action issued in Indian Application No. 202417072127, dated Jul. 23, 2026.

* cited by examiner

*Primary Examiner* — Imani N Hayman
*Assistant Examiner* — Hung Q Dang
(74) *Attorney, Agent, or Firm* — Knobbe, Martens, Olson & Bear, LLP

(57) ABSTRACT

A base member includes a bottom plate and a side plate. A plurality of first capacitors are aligned in a second direction on the bottom plate. The side plate is arranged upright in the first direction on the bottom plate. A pair of fin portions of each of fixation members are mounted on the side plate to fix the first capacitors to the base member. On the side plate, the fixation members on odd rows in the alignment direction are equal in position in the first direction. The fixation members on even rows in the alignment direction are equal in position in the first direction and differ in position in the first direction from the fixation members on the odd rows. The fin portions of two fixation members, adjacent to each other in the second direction, are aligned in the first direction.

14 Claims, 10 Drawing Sheets

CAPACITOR UNIT AND POWER CONVERSION DEVICE

TECHNICAL FIELD

The present disclosure relates to a capacitor unit and a power conversion device.

BACKGROUND ART

Japanese Patent Laying-Open No. 2006-173417 (PTL 1) discloses a capacitor mounting fixture for fixing to a capacitor mounting body a cylindrical, electrolytic capacitor for use in a power conversion device, etc. The capacitor mounting fixture has a bottom having a disc shape, and a plurality of holding pieces that are arranged upright on the bottom and arranged in an annular shape surrounding a space for holding the capacitor. The bottom includes multiple mounting portions formed of projections having fixing mounting holes. The mounting portions project radially outwardly from the bottom. The capacitor mounting fixture is mounted on the capacitor mounting body by fixture-fixing screws mating with the fixing mounting holes of the mounting portions.

CITATION LIST

Patent Literature

PTL 1: Japanese Patent Laying-Open No. 2006-173417

SUMMARY OF INVENTION

Technical Problem

In PTL 1, a space is required around the perimeter of the capacitor mounting fixture, for screwing the mounting portions into the capacitor mounting body. Therefore, it is necessary to secure a gap as much as this space between adjacent capacitors. Accordingly, the area, occupied by the capacitor unit that includes multiple capacitors, may increase with an increase in number of capacitor mounting fixtures in proportion to the number of capacitors.

The present disclosure is made to solve the above problem, and an object of the present disclosure is to provide a capacitor unit having multiple capacitors that has a reduced size, while ensuring the workability of a respective capacitor.

Solution to Problem

A capacitor unit according one aspect of the present disclosure includes: a plurality of capacitors each having a cylindrical portion extending in a first direction; a housing on which the plurality of capacitors are mounted; and a plurality of fixation members for fixing the plurality of capacitors to the housing. Each of the plurality of fixation members has a main part that has a band shape and mounted to the cylindrical portion, and a pair of fin portions that are bonded to opposing ends of the main part in an extension direction of the main part. The plurality of capacitors include a plurality of first capacitors. The plurality of fixation members include a plurality of first fixation members corresponding to the plurality of first capacitors. The housing includes a first base member on which the plurality of first capacitors are mounted. The first base member includes a first bottom plate and a first side plate. The first bottom plate extends in a second direction orthogonal to the first direction, and the plurality of first capacitors are aligned thereon in the second direction as an alignment direction. The first side plate is bonded to an end of the first bottom plate in a third direction orthogonal to the first direction and the second direction, the first side plate being arranged upright in the first direction on the first bottom plate. The pair of fin portions of each of the plurality of first fixation members are mounted on the first side plate to fix the plurality of first capacitors to the first base member. On the first side plate, among the plurality of first fixation members, first fixation members on odd rows in the alignment direction are equal in position in the first direction. First fixation members on even rows in the alignment direction are equal in position in the first direction and differ, in position in the first direction, from first fixation members on the odd rows. Fin portions of two first fixation members that are adjacent to each other in the second direction are aligned in the first direction.

Advantageous Effects of Invention

According to the present disclosure, a capacitor unit having multiple capacitors can have a reduced size, while ensuring the workability for a respective capacitor.

DESCRIPTION OF EMBODIMENTS

Figure 1:
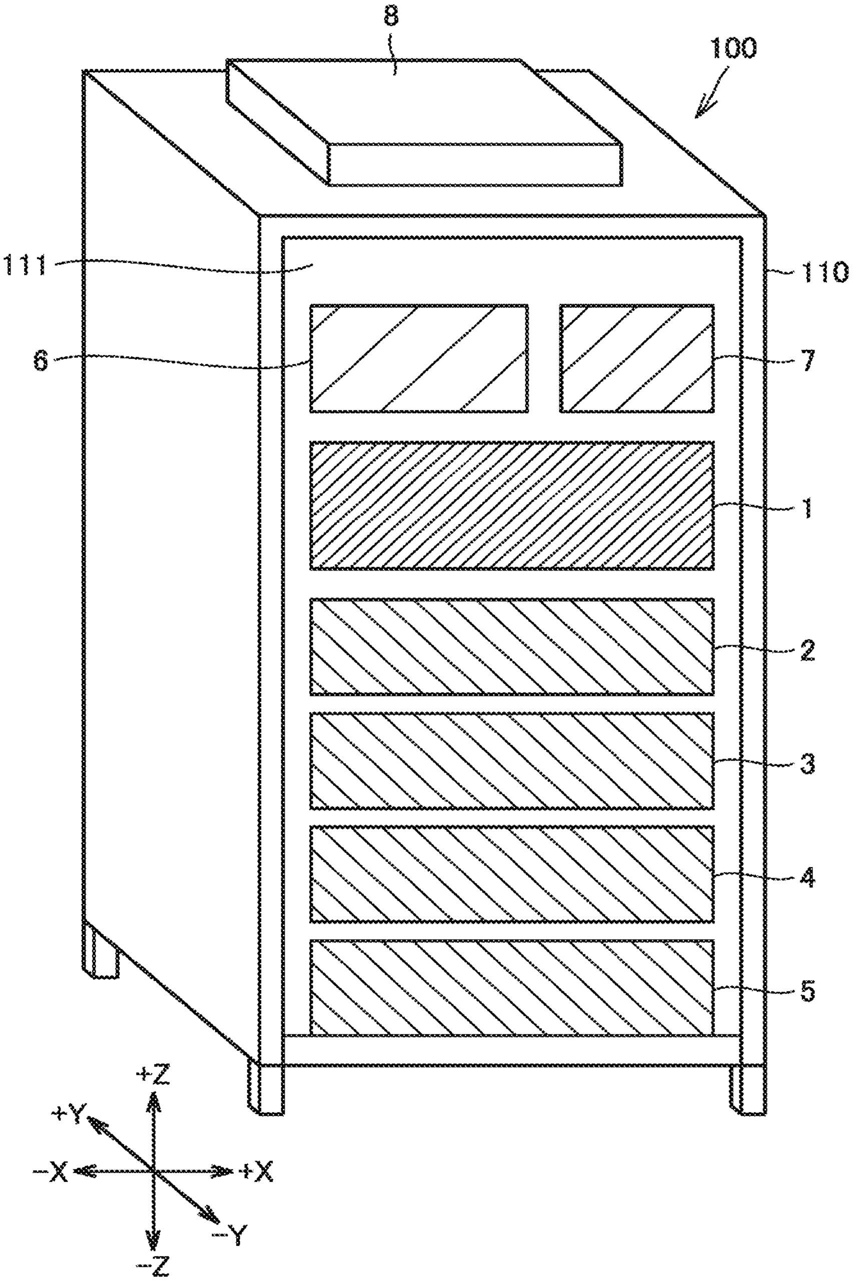
FIG. 1 is a schematic, external view of a configuration example of a power conversion device according an embodiment.

Hereinafter, an embodiment of the present disclosure will be described in detail, with reference to the accompanying drawings. Note that, in the following, the same reference sign is used to refer to like or corresponding components in the drawings, and description thereof will in principle not be repeated.

<Configuration Example of Power Conversion Device>

FIG. 1 is a schematic, external view of a configuration example of a power conversion device according an embodiment of the present disclosure. The power conversion device according to the present embodiment is, typically, applicable to an uninterruptible power supply 100. The uninterruptible power supply 100 is connected between an alternating-current (AC) power supply such as a commercial power supply, and a load. The uninterruptible power supply 100, in normal operation, supplies the load with the AC power supplied from the AC power supply. If the AC power supply is interrupted, the uninterruptible power supply 100 supplies the load with the DC power that is supplied from a power storage device.

As shown in FIG. 1, the uninterruptible power supply 100 includes a housing 110 having a board shape (a cuboid shape), multiple units 1 to 7, and a fan 8. In the following description, the left-right direction (horizontal direction) when the housing 110 is viewed from the front will be referred to as X-axis direction, the front-rear direction will be referred to as Y-axis direction, and the vertical direction will be referred to as Z-axis direction. Z-axis direction corresponds to one example of a "first direction." Y-axis direction corresponds to one example of a "second direction." X-axis direction corresponds to one example of a "third direction."

Note that a positive X direction is a direction proceeding in X-axis direction to the right, and a negative X direction is a direction opposite the positive X direction. A positive Y direction is a direction from the front of the uninterruptible power supply 100 to the rear thereof. A negative Y direction is a direction opposite the positive Y direction. A positive Z direction is a direction proceeding in Z-axis direction upward, and a negative Z direction is a direction opposite the positive Z direction.

The housing 110 accommodates the units 1 to 7. The housing 110 has an opening 111 that opens in the negative Y direction, and a front cover (not shown) for covering the opening 111. The front cover is disposed in a manner allowing the opening 111 to be open or closed. The front cover has an air vent formed therein for introducing the air outside the housing 110 into the housing 110.

The units 1 to 7 have a generally cuboid shape, and are stacked in Z-axis direction, spaced apart from each other. The units 1 to 7 include: a capacitor unit 1 which includes multiple capacitors; and element units 2 to 7 which include elements other than capacitors. The element units 2 to 7 include a chopper circuit 2, power converters (hereinafter, also referred to as a "converter unit") 3, 4, and 5, a control device 6, and a breaker unit 7. Configurations of the capacitor unit 1 and the element units 2 to 7 will be described below.

The units 1 to 7 are inserted into the housing 110 from outside the housing 110 through the opening 111. The units 1 to 7 are detachably disposed in Y-axis direction so that the maintenance and replacement by a new one can be facilitated.

The fan 8 is disposed on the upper surface of the housing 110. The fan 8 draws in the air inside the housing 110 to exhaust it from the housing 110. This causes the air to be introduced into the housing 100 through the air vent in the front cover of the housing 110, and the introduced air passes through the units 1 to 7, thereby facilitating dissipation of heat from the units 1 to 7. The air warmed by passing through the units 1 to 7 is exhausted from the housing 110.

Figure 2:
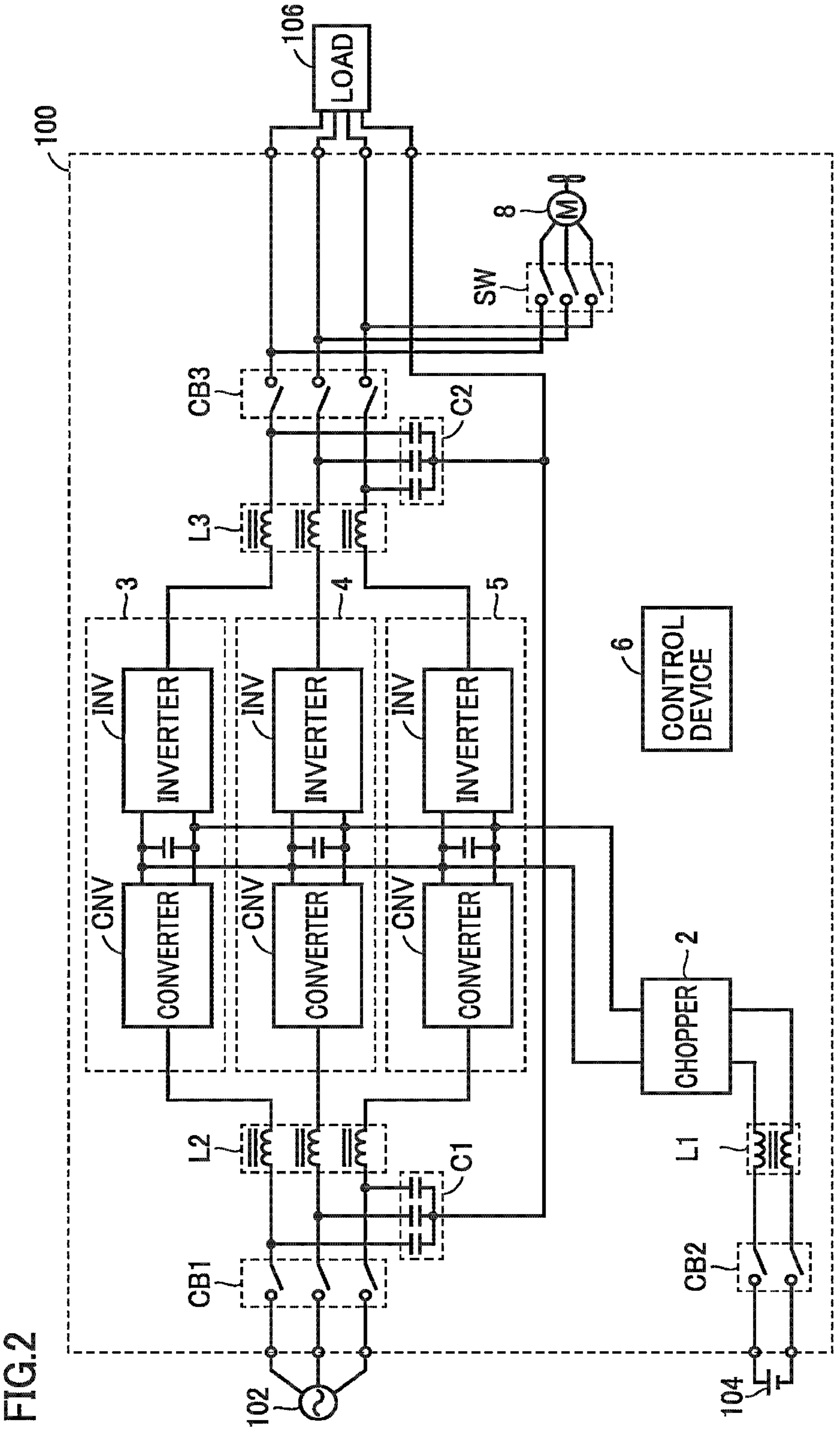
FIG. 2 is a circuit diagram showing a configuration of an uninterruptible power supply.

FIG. 2 is a circuit diagram showing a configuration of the uninterruptible power supply 100. As shown in FIG. 2, the uninterruptible power supply 100 includes the chopper circuit 2, the converter units 3 to 5, the control device 6, the fan 8, capacitors C1 and C2, breakers CB1, CB2, and CB3, reactors L1, L2, and L3, and a switch SW. The uninterruptible power supply 100 is connected to a power storage device 104. The uninterruptible power supply 100 is connected to the AC power supply 102 in a 3-phase 3-wire system and to the load 106 in a 3-phase, 4-wire system.

The converter units 3, 4, and 5 are disposed in correspondence with U phase, V phase, and W phase, respectively. The converter units 3 to 5 each have a converter CNV and an inverter INV.

A three-phase AC power input from the AC power supply 102 passes through the breaker CB1 and then the reactor L2, and are input to the converter units 3 to 5. The converter units 3 to 5 convert the three-phase AC power into DC power, and converts the DC power into a three-phase AC power to be supplied to the load 106. The converter units 3 to 5 output the three-phase AC power as a result of the conversion to the load 106 and the fan 8 via the reactor L3 and then the breaker CB3. The fan 8 includes the switch SW on the input side.

Each phase on the input side of the uninterruptible power supply 100 is connected to a neutral on the output side of the uninterruptible power supply 100 via the capacitor C1. Each phase on the output side of the uninterruptible power supply 100 is connected to a neutral on the output side of the uninterruptible power supply 100 via the capacitor C2.

The power storage device 104 accumulates energy for supplying power when the AC power supply 102 is interrupted. In the event of interruption of the AC power supply 102, the DC power, output from the power storage device 104, passes through the breaker CB2 and then the reactor L1, and is supplied to the chopper circuit 2.

The chopper circuit 2 steps up the DC voltage provided from the power storage device 104, and supplies a resultant DC power to the DC links of the converter units 3 to 5. To charge the power storage device 104, the chopper circuit 2 operates to charge to the power storage device 104 the DC power that are input through the DC links of the converter units 3 to 5. The chopper circuit 2 and the converter units 3 to 5 each have an electric circuit that includes a semiconductor switching element, such as an insulated gate bipolar transistor (IGBT).

The control device 6 controls the entirety of the uninterruptible power supply 100. The control device 6 detects whether the AC power supply 102 is interrupted, and controls the operations of the chopper circuit 2 and the converter units 3 to 5 in accordance with a result of the detection. The control device 6 further controls on and off of the breakers CB1 to CB3 and the switch SW.

The capacitors C1 and C2 are accommodated in the capacitor unit 1 shown in FIG. 1. Although not shown, the reactors L1 to L3 are disposed in a space in the housing 110 behind a space where the converter units 3 to 5 are implemented. The breakers CB1 to CB3 are accommodated in the breaker unit 7 shown in FIG. 1.

In the example of FIG. 1, the converter unit 4 for V phase is disposed above the converter unit 5 for W phase, the converter unit 3 for U phase is disposed above the converter unit 4 for V phase, and the chopper circuit 2 is disposed above the converter unit 3 for U phase.

The capacitor unit 1 is disposed above the chopper circuit 2. The control device 6 and the breaker unit 7 are disposed above the capacitor unit 1.

While FIG. 1 shows a configuration example in which the chopper circuit 2, the converter units 3 to 5, the control device 6, and the breaker unit 7 shown in FIG. 2 are implemented as the element units 2 to 7, it should be noted that elements constituting the electric circuit shown in FIG. 2 and equipment are also implemented within the uninterruptible power supply 100.

<Configuration Example of Capacitor Unit>

Figure 3:
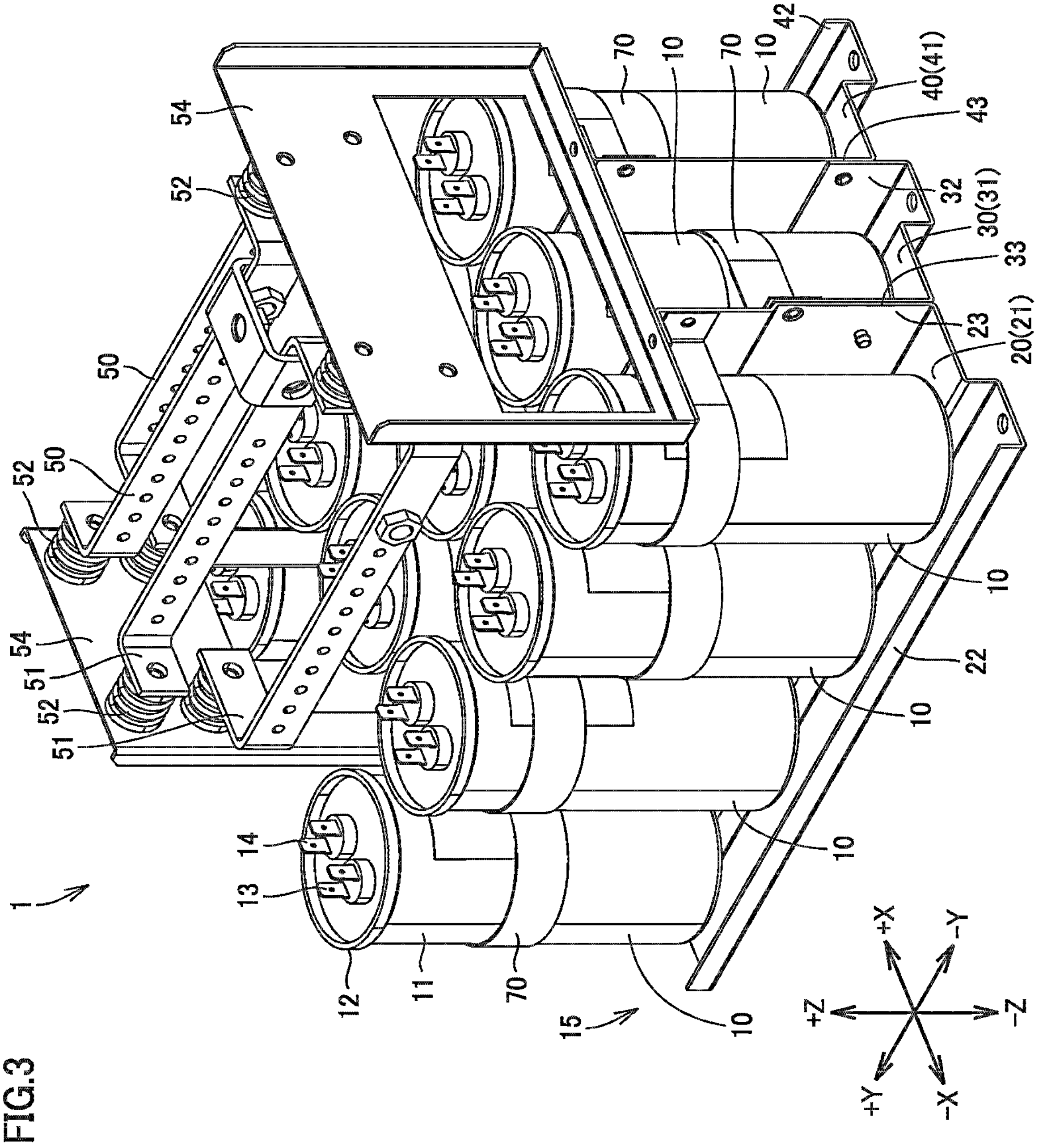
FIG. 3 is an external view of a capacitor unit.

FIG. 3 is an external view of the capacitor unit 1 of FIG. 1. As shown in FIG. 3, the external view is a perspective view of the capacitor unit 1 when viewed from the front side of the housing 110.

As shown in FIG. 3, the capacitor unit 1 includes multiple capacitors 10, and base members 20, 30, and 40. The capacitors 10 include the capacitors C1 and C2 of FIG. 2.

The capacitors 10 each have: a cylindrical portion 11 having a cylindrical shape; a lid 12 disposed at one end of the cylindrical portion 11; and a positive terminal 13 and a negative terminal 14 that are formed on the lid 12. The shape of the cylindrical portion 11 is not limited to a cylindrical shape. The capacitors 10 are mounted on the base members 20, 30, and 40, with the terminals 13 and 14 up. The base members 20, 30, and 40 constitutes a housing 15 for accommodating the capacitors 10 by adjacent base members in X-axis direction being coupled and thereby integrated with each other.

The base member 20 has a bottom plate 21 having a rectangular plate shape, and side plates 23 and 22 each having a rectangular plate shape. The base member 20 is formed of a sheet-metal component being bent, for example. The base member 20 corresponds to one example of a “first base member.”

The bottom plate 21 extends in Y-axis direction. A capacitor 10 is mounted on the bottom plate 21. Multiple (four in FIG. 3) capacitors 10 are aligned in Y-axis direction on the bottom plate 21. The capacitors 10 each correspond to one example of a “first capacitor.” The bottom plate 21 corresponds to one example of a “first bottom plate.”

The side plate 23 is bonded to a first end of the bottom plate 21 in the positive X-axis direction, and arranged upright in Z-axis direction on the bottom plate 21. The side plate 23 extends in Y-axis direction. A fixation member 70 is mounted on the side plate 23, for fixing a capacitor 10 to the base member 20. The side plate 23 corresponds to one example of a “first side plate.”

The side plate 22 is bonded to a second end of the bottom plate 21 in the negative X-axis direction, and vertically projecting from the bottom plate 21.

The base member 30 has a bottom plate 31 having a rectangular plate shape, and side plates 33 and 32 each having a rectangular plate shape. The base member 30 is formed of a sheet-metal component being bent, for example. The base member 30 corresponds to one example of a “second base member.”

The bottom plate 31 extends in Y-axis direction. A capacitor 10 is mounted on the bottom plate 31. Multiple (three in FIG. 3) capacitors 10 are aligned in Y-axis direction on the bottom plate 31. The capacitors 10 each correspond to one example of a “second capacitor.” The bottom plate 31 corresponds to one example of a “second bottom plate.”

The side plate 33 is bonded to a first end of the bottom plate 31 in the negative X-axis direction, and arranged upright in Z-axis direction on the bottom plate 31. The side plate 33 extends in Y-axis direction. A fixation member 70 is mounted on the side plate 33, for fixing a capacitor 10 to the base member 30. The side plate 33 corresponds to one example of a “second side plate.”

The side plate 33 is disposed so that a surface of the side plate 33 and a surface of the side plate 23 are in area contact, the surface of the side plate 33 being opposite the surface on which the fixation member 70 is mounted, the surface of the side plate 23 being opposite the surface on which the fixation member 70 is mounted. The side plate 33 is bonded to the side plate 23 by fastener members such as rivets. The bottom plate 21 and the bottom plate 31 are the same in position in Z-axis direction. The side plate 33 is shorter in length than the side plate 23 in Z-axis direction.

The side plate 32 is bonded to a second end of the bottom plate 31 in the positive X-axis direction, and vertically projecting from the bottom plate 31.

The base member 40 has a bottom plate 41 having a rectangular plate shape, and side plates 43 and 42 each having a rectangular plate shape. The base member 40 is formed of a sheet-metal component being bent, for example. The bottom plate 41 extends in Y-axis direction. A capacitor 10 is mounted on the bottom plate 41. Multiple (four in FIG. 3) capacitors 10 are aligned in Y-axis direction on the bottom plate 41.

The side plate 43 is bonded to a first end of the bottom plate 41 in the negative X-axis direction, and arranged upright in Z-axis direction on the bottom plate 41. The side plate 43 extends in Y-axis direction. A fixation member 70 is mounted on the side plate 43, for fixing a capacitor 10 to the base member 40. The side plate 43 is disposed so that a surface of the side plate 43 and the side plate 32 are in area contact, the surface of the side plate 43 being opposite the surface on which the fixation member 70 is mounted. The side plate 43 is bonded to the side plate 32 by fastener members such as rivets. The bottom plate 31 and the bottom plate 41 are the same in position in Z-axis direction. In other words, the bottom plate 21, the bottom plate 31, and the bottom plate 41 are the same in position in Z-axis direction. The side plate 43 is longer in length than the side plate 32 in Z-axis direction.

The side plate 42 is bonded to a second end of the bottom plate 41 in the positive X-axis direction, and vertically projecting from the bottom plate 41.

Multiple busbars 50, each having a rectangular plate shape, are arranged above the housing 15 in Z-axis direction. The busbars 50 are metallic conductors for electrically connecting the capacitor unit 1 to the converter units 3 to 5. Each busbar 50 extends in Y-axis direction. Each busbar 50 has multiple through-holes formed therein passing through the busbar 50 in the direction of thickness of the busbar 50. The through-holes are aligned in Y-axis direction. Each capacitor 10 has a positive terminal 13 and a negative terminal 14 that are connected to a corresponding busbar 50 with wiring members not shown.

The opposing ends of each busbar 50 in Y-axis direction are vertically bent in X-axis direction. The opposing ends of each busbar 50 are mounted on a pair of support members 54 by insulators 52. The insulator 52 is formed of an insulating material. The pair of support member 54 are each formed in a rectangular plate shape extending in X-axis direction. The pair of support member 54 are disposed facing each other in Y-axis direction. The busbars 50 are supported by the pair of support member 54.

<Mounting Structure of Capacitors>

Next, referring to FIGS. 4 to 7, a mounting structure of the capacitors 10 in the capacitor unit 1 is described.

Figure 4:
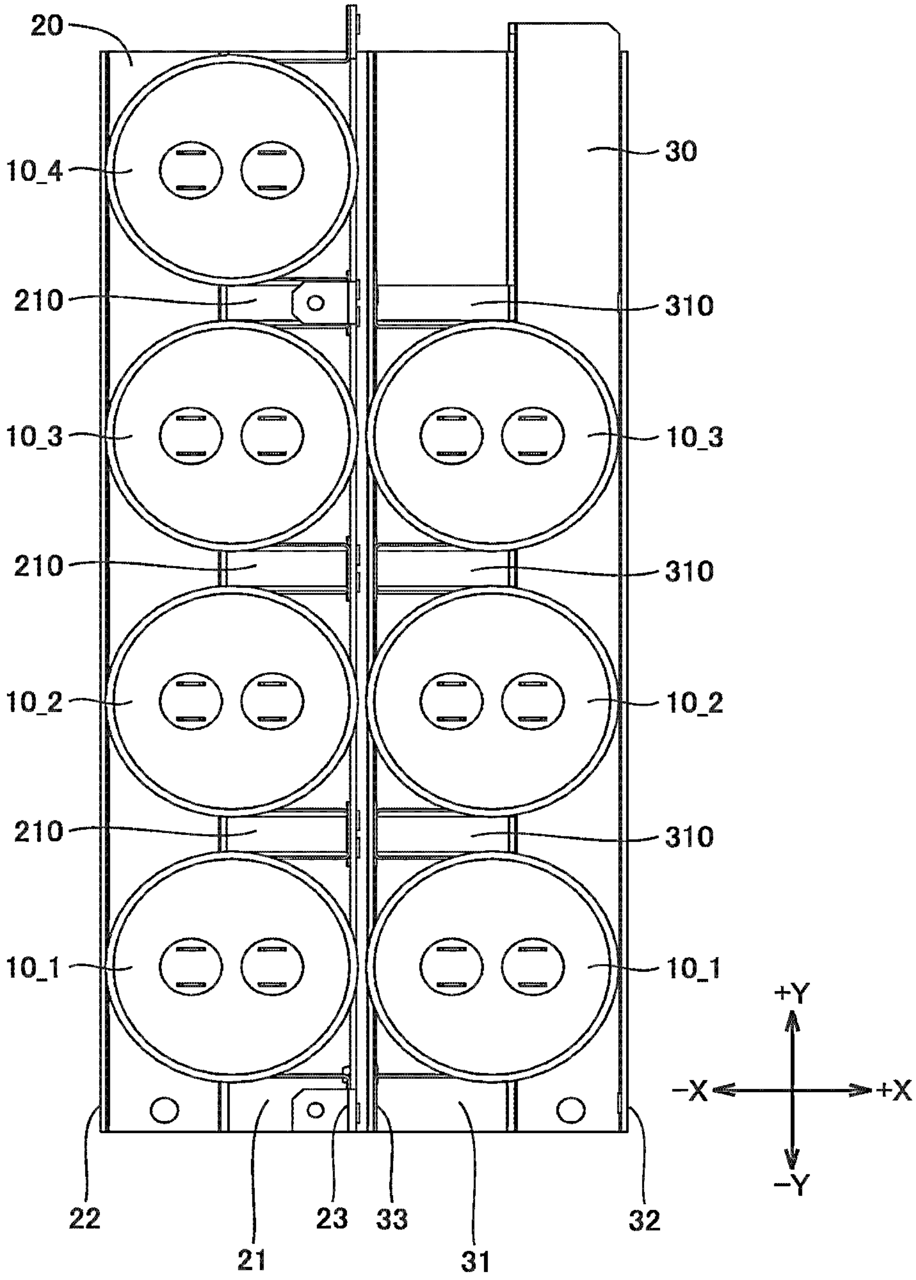
FIG. 4 is a top view of the capacitor unit.
Figure 5:
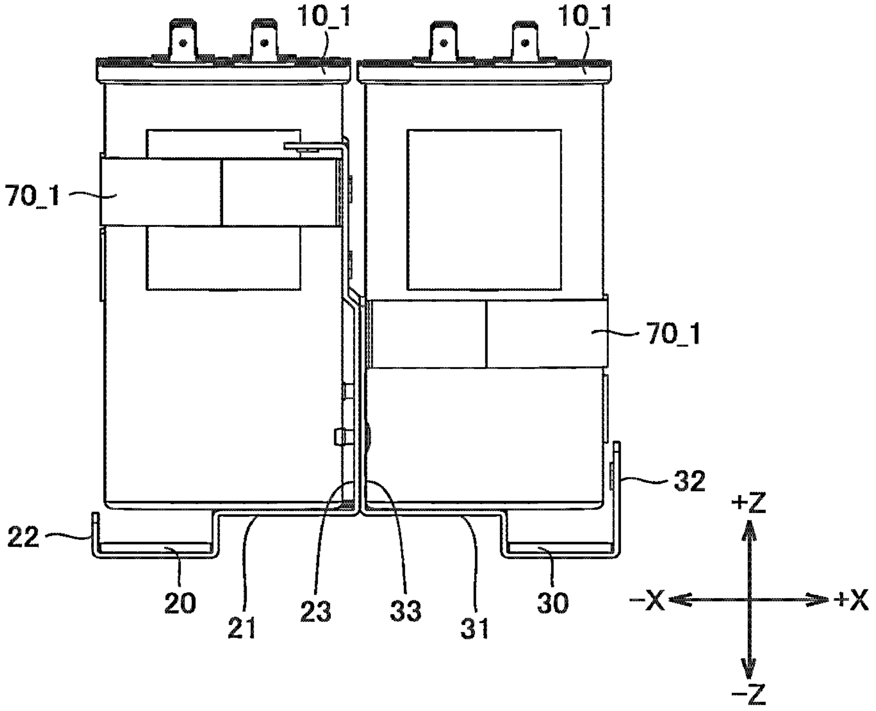
FIG. 5 is a front view of the capacitor unit.
Figure 6:
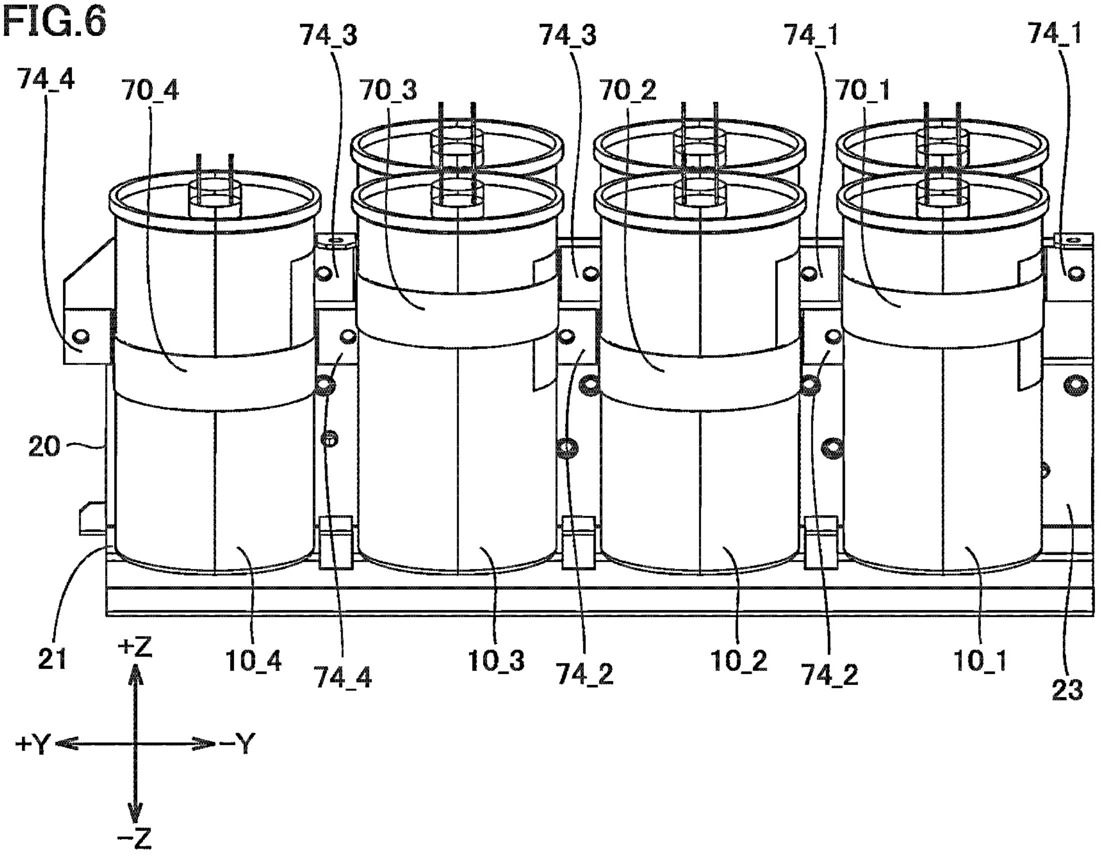
FIG. 6 is a side view of the capacitor unit.
Figure 7:
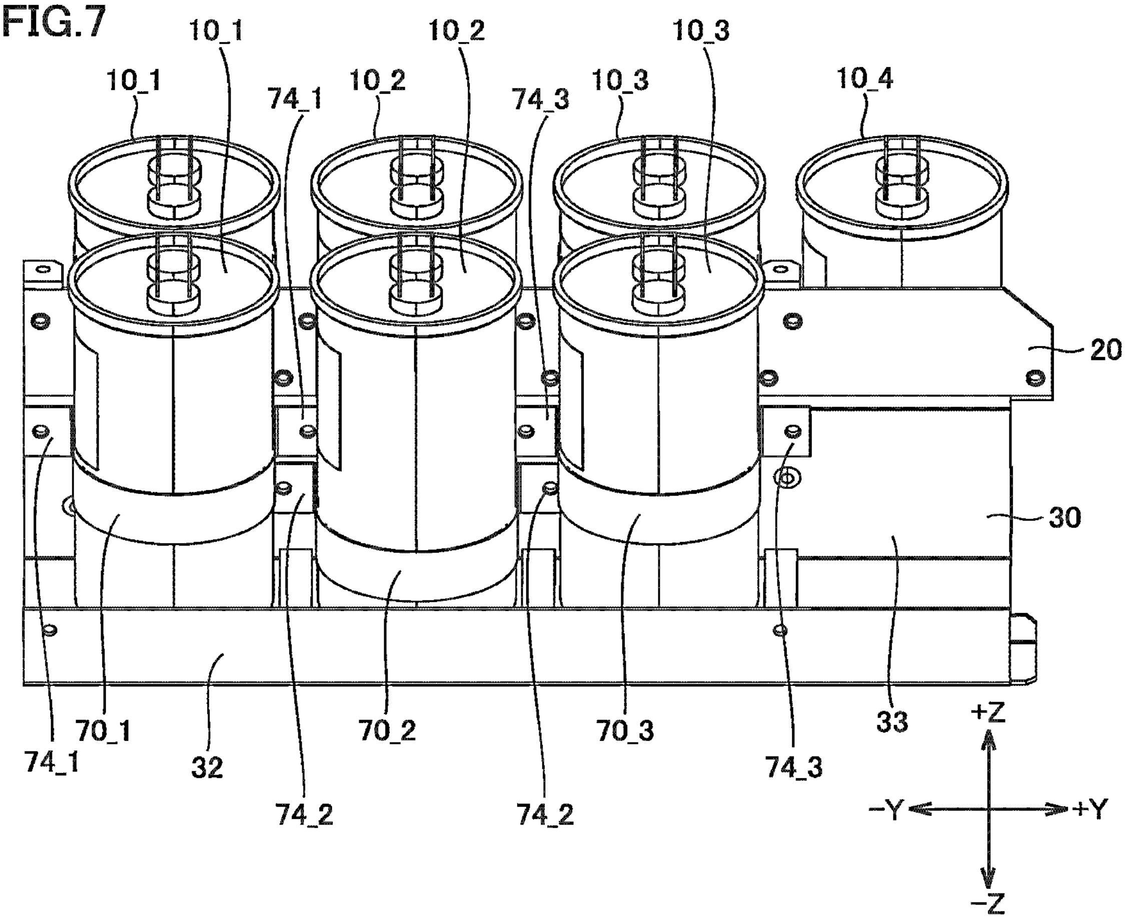
FIG. 7 is a side view of the capacitor unit.

FIG. 4 is a top view showing one example arrangement of the capacitors 10 in the capacitor unit 1. FIG. 5 is a front view of the capacitor unit 1 of FIG. 4, as viewed from the front (the negative Y-axis direction). FIG. 6 is a side view of the capacitor unit 1 of FIG. 4, as viewed from the left (the negative X-axis direction) of the figure. FIG. 7 is a side view of the capacitor unit 1 of FIG. 4, as viewed from the right (the positive X-axis direction) of the figure. For ease of understanding of the mounting structure, FIGS. 4 to 7 show only the base members 20 and 30, among the components of the housing 15.

As shown in FIG. 4, four capacitors 10 are aligned in Y-axis direction on the bottom plate 21 of the base member 20. In the following description, the capacitor 10 that is disposed on the front row (the first row) of the capacitor unit 1 will also be referred to as a “capacitor 10_1,” the capacitor 10 disposed on the second row will also be referred to as a “capacitor 10_2,” the capacitor 10 disposed on the third row will also be referred to as a “capacitor 10_3,” and the capacitor 10 disposed on the fourth row will also be referred to as a “capacitor 10_4.”

There is a gap between adjacent two capacitors 10 in Y-axis direction. This gap is provided to ensure the workability of mounting and dismounting of each capacitor 10. The bottom plate 21 has an opening 210 formed therein, the opening 210, in plan view as viewed from Z-axis direction, being aligned with the gap. The opening 210 passes through the bottom plate 21 in the direction of thickness of the bottom plate 21. The opening 210 can function as a vent hole, as described below. The opening 210 corresponds to one example of a "first opening."

Three capacitors 10 are aligned in Y-axis direction on the bottom plate 31 of the base member 30. There is a gap between adjacent two capacitors in Y-axis direction. The bottom plate 31 has an opening 310 formed therein, the opening 310, in plan view as viewed from Z-axis direction, being aligned with the gap. The opening 310 passes through the bottom plate 31 in the direction of thickness of the bottom plate 31. The opening 310 can function as a vent hole, as described below. The opening 310 corresponds to one example of a "second opening."

The capacitor 10_1 on the bottom plate 21 and the capacitor 10_1 on the bottom plate 31 are aligned in X-axis direction, separated from each other by the side plates 23 and 33. Two capacitors 10_2 are also aligned in X-axis direction. Two capacitors 10_3 are also aligned in X-axis direction. In this manner, the capacitors 10 are arranged in a matrix in the housing 15 in Y-axis direction and X-axis direction, thereby achieving a reduced occupied area by the capacitor unit 1.

Figure 8:
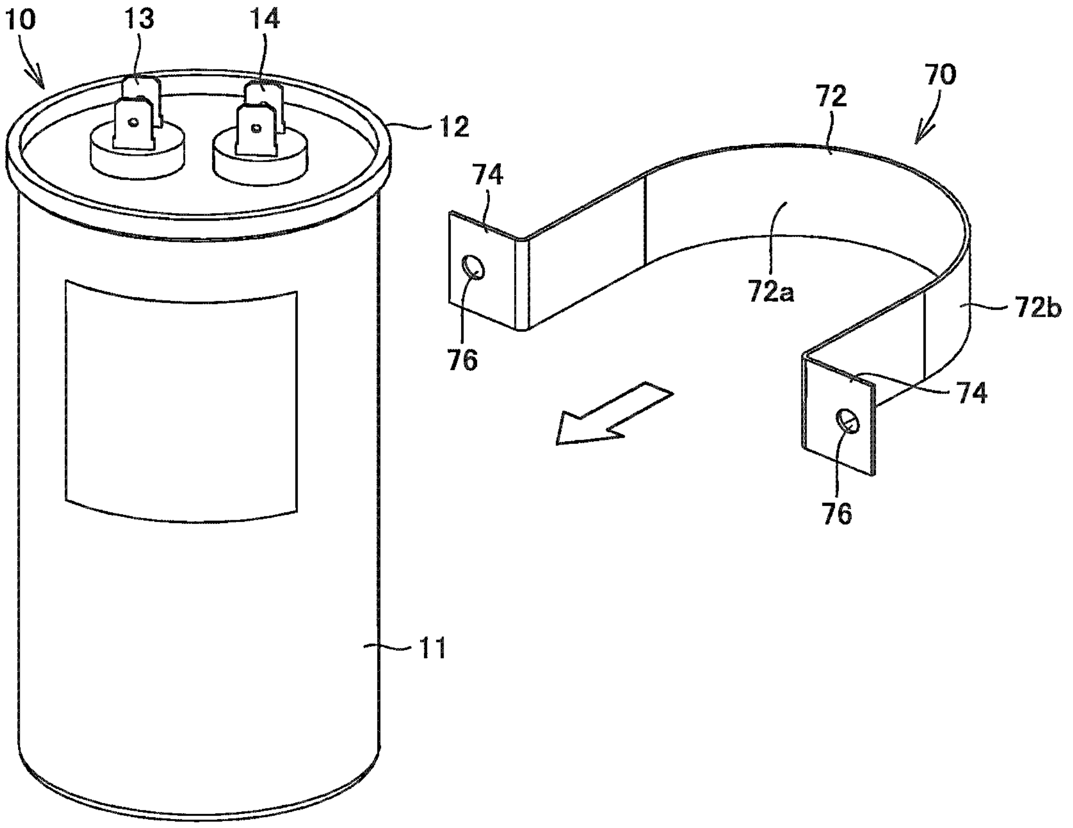
FIG. 8 is a diagram showing a configuration example of a fixation member.

As shown in FIGS. 5 to 7, each capacitor 10 is fixed to the base members 20 and 30 with the fixation member 70. FIG. 8 is a diagram showing a configuration example of the fixation member 70. As shown in FIG. 8, the fixation member 70 has a main part 72 having a U shape, and a pair of fin portions 74.

The main part 72 is formed of a band-shaped material being bent. The main part 72 has an inner surface 72*a*, which is a first surface, and an outer surface 72*b* which is a second surface.

The pair of fin portions 74 are bonded to the opposing ends of the main part 72 in the extension direction of the main part 72. Each fin portion 74 has a rectangular plate shape, and vertically projecting from an end of the main part 72. The pair of fin portions 74 are coplanar with each other. Each fin portion 74 has a through-hole 76 formed therein, passing through the fin portion 74 in the direction of thickness of the fin portion 74.

The fixation member 70 is mounted on the capacitor 10 so that the main part 72 wraps around the cylindrical portion 11 of the capacitor 10. The inner surface 72*a* of the main part 72 is in area contact with the side surface of the cylindrical portion 11. As the pair of fin portions 74 are mounted on the side plate 23 with the capacitor 10 resting on the bottom plate 21, the capacitor 10 is fixed to the base member 20. Similarly, as the pair of fin portions 74 are mounted on the side plate 33 with the capacitor 10 resting on the bottom plate 31, the capacitor 10 is fixed to the base member 30.

FIG. 5 shows two capacitors 10_1 as being fixed to the base members 20 and 30, respectively, with the fixation members 70. In the following description, the fixation member 70 on the first row that is mounted to the capacitor 10_1 will also be referred to as a "fixation member 70_1," the fixation member 70 on the second row that is mounted to the capacitor 10_2 will also be referred to as a "fixation member 70_2," the fixation member 70 on the third row that is mounted to the capacitor 10_3 will also be referred to as a "fixation member 70_3," and the fixation member 70 on the fourth row that is mounted to the capacitor 10_4 will also be referred to as a "fixation member 70_4."

As shown in FIG. 5, the fixation member 70_1 bonded to the side plate 23 and the fixation member 70_1 bonded to the side plate 33 are different in position in Z-axis direction. In other words, two fixation members 70_1 are staggered from each other in Z-axis direction. Note that two fixation members 70_1 are the same in position in Y-axis direction.

FIG. 6 illustrates four capacitors 10 that are fixed to the base member 20 by four fixation members 70, respectively. As shown in FIG. 6, the fixation member 70 that is mounted to one of adjacent two capacitors 10 in Y-axis direction and the fixation member 70 that is mounted to the other one of the adjacent two capacitors 10 are different in position in Z-axis direction. In other words, the two fixation members 70 mounted to the adjacent two capacitors 10 in Y-axis direction are staggered from each other in Z-axis direction.

Furthermore, the fixation member 70_1 and the fixation member 70_3 are the same in position in Z-axis direction. The fixation member 70_2 and the fixation member 70_4 are the same in position in Z-axis direction. In other words, the fixation members 70 on even rows are equal to each other in position in Z-axis direction, and the fixation members 70 on odd rows are equal to each other in position in Z-axis direction. The fixation members 70 on even rows differ in position in Z-axis direction from the fixation members 70 on odd rows.

Figure 9:
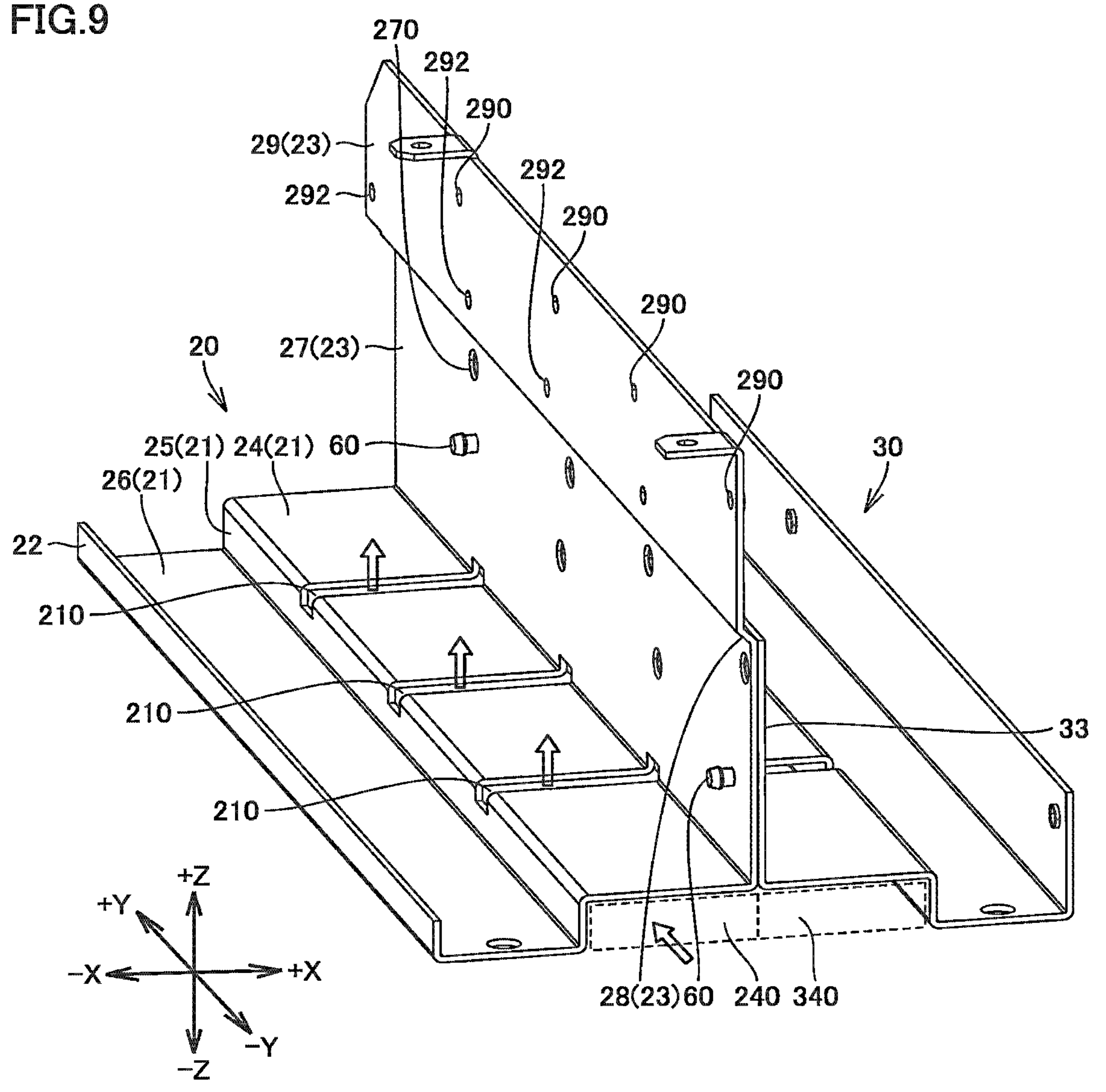
FIG. 9 is a perspective view of a base member.

The side plate 23 has multiple through-holes 290 and 292 formed therein, passing through the side plate 23 in the direction of thickness of the side plate 23 (see FIG. 9). The through-holes 290 and 292 are aligned with the attachment points of four fixation members 70. The through-holes 76, which are formed in the pair of fin portions 74 of one fixation member 70, and the pair of through-holes, which are formed in the side plate 23 in align with the fixation member 70, align and are concentrically arranged. The fixation member 70 is mounted on the side plate 23 by fastener members such as screws threaded through the aligned two through-holes. This fixes the capacitor 10 to the base member 20.

The fixation members 70 on odd rows and the fixation members 70 on even rows are arranged so that their fin portions 74 are aligned in Z-axis direction. Specifically, the first fin portion 74_1 of the fixation member 70_1 in the positive Y-axis direction, and the first fin portion 74_2 of the fixation member 70_2 in the negative Y-axis direction are aligned in Z-axis direction. The second fin portion 74_2 of the fixation member 70_2 in the positive Y-axis direction, and the first fin portion 74_3 of the fixation member 70_3 in the negative Y-axis direction are aligned in Z-axis direction. The second fin portion 74_3 of the fixation member 70_3 in the positive Y-axis direction, and the first fin portion 74_4 of the fixation member 70_4 in the negative Y-axis direction are aligned in Z-axis direction.

With such an arrangement, the length of the side plate 23 in Y-axis direction can be reduced, as compared to a configuration in which four fixation members 70 are aligned in Y-axis direction and mounted on the side plate 23. In other words, the length of the side plate 23 in Y-axis direction can be reduced by a total overlap length of the two fin portions 74 aligned in Z-axis direction. This can prevent the base member 20 in Y-axis direction from increasing with an increase in number of capacitors 10 mounted on the base member 20.

Furthermore, the two fin portions 74 aligned in Z-axis direction, in plan view as viewed from X-axis direction (the vertical direction to the plane of the figure), are located at a gap between adjacent two capacitors 10 in Y-axis direction.

This gap can be set to have minimum spacing allowing the fastener member to be mount onto and dismounted from the two fin portions 74. This can reduce the size of the capacitor unit 1, while ensuring the workability of mounting and dismounting of each capacitor 10.

FIG. 7 shows three capacitors 10 that are fixed to the base member 30 by three fixation members 70, respectively. In FIG. 7, similarly to FIG. 6, the fixation members 70 on odd rows are equal to each other in position in Z-axis direction. The fixation members 70 on even rows differ in position in Z-axis direction from the fixation members 70 on odd rows. Note that two fixation members 70 on each row are the same in position in Y-axis direction.

Figure 10:
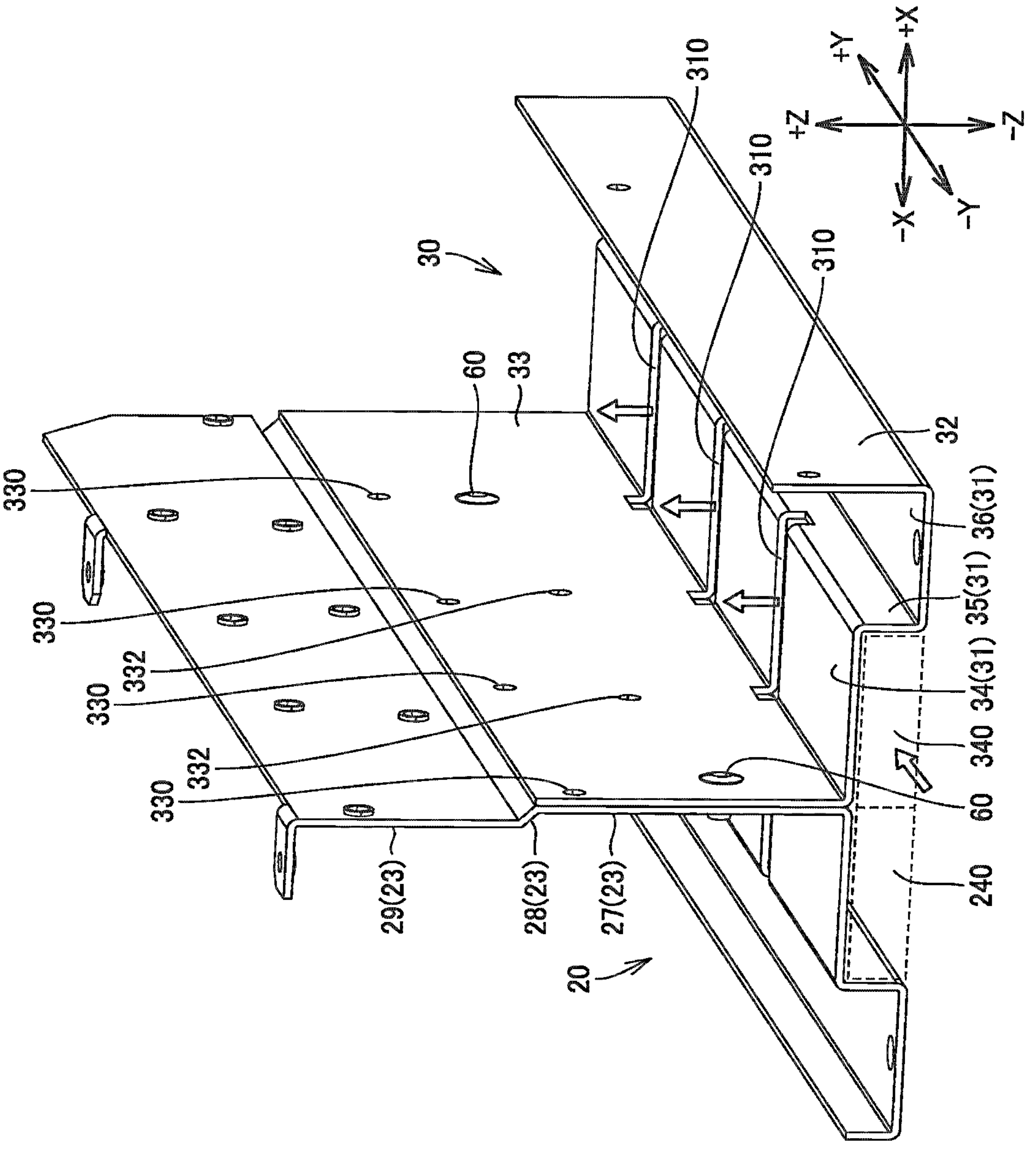
FIG. 10 is a perspective view of the base member.

The side plate 33 has through-holes 330 and 332 formed therein, passing through the side plate 33 in the direction of thickness of the side plate 33 (see FIG. 10). Furthermore, the side plate 23, which is in area contact with the side plate 33, has multiple through-holes 270 formed therein, passing through the side plate 23 in the direction of thickness of the side plate 23 (see FIG. 9). The through-holes 330 and 332, formed in the side plate 33, and the multiple through-holes 270, formed in the side plate 23, align and are concentrically arranged.

The through-holes 330 and 332 formed in the side plate 33 are aligned with attachment points of three fixation members 70. The through-holes 76, formed in the pair of fin portions 74 of one fixation member 70, and the pair of through-holes, formed in the side plates 33 and 23 in align with the fixation member 70, align and are concentrically arranged. The fixation member 70 is mounted on the side plate 33 by fastener members such as screws threaded through the aligned two through-holes. This fixes the capacitor 10 to the base member 30.

Similarly to the base member 20, the first fin portion 74 of the fixation member 70_1 in the positive Y-axis direction and the first fin portion 74 of the fixation member 702 in the negative Y-axis direction are aligned in Z-axis direction on the base member 30. The second fin portion 74 of the fixation member 702 in the positive Y-axis direction and the first fin portion 74 of the fixation member 70_3 in the negative Y-axis direction are aligned in Z-axis direction.

Here, comparing FIGS. 6 and 7, four fixation members 70 mounted on the side plate 23 differ in position in Z-axis direction from three fixation members 70 mounted on the side plate 33. The four fixation members 70 are higher in position in Z-axis direction than the three fixation members 70 in Z-axis direction. Specifically, the fixation members 70 on odd rows mounted on the side plate 23 is highest in position in Z-axis direction. The fixation members 70 on even rows mounted on the side plate 23 is lower in position in Z-axis direction than the fixation members 70 on odd rows mounted on the side plate 23, and higher in position in Z-axis direction than the fixation members 70 on odd rows mounted on the side plate 33. The fixation members 70 on even rows mounted on the side plate 33 are lowest in position in Z-axis direction.

In this manner, two fixation members 70 mounted on two capacitors 10 on each row are staggered from each other in Z-axis direction, thereby avoiding an overlap between the attachment point of the fixation member 70 for the side plate 23 and the attachment point of the fixation member 70 for the side plate 33. This enables two capacitors 10 on each row to be aligned in X-axis direction, as shown in FIG. 4. Thus, the capacitors 10 can be arranged a matrix along X-axis direction and Y-axis direction.

Note that the fin portions 74 of four fixation members 70 are aligned in Z-axis direction at the gap between adjacent two capacitors 10 in Y-axis direction. Accordingly, the workability is ensured of mounting and dismounting of the fastener member to and from a respective fin portion 74.

<Configuration Example of Base Member>

Next, referring to FIGS. 9 and 10, a configuration example of the base members 20 and 30 is specifically described.

FIG. 9 is a perspective view of the base members 20 and 30 as viewed in the negative X-axis direction. The base member 20 has a bottom plate 21, and side plates 22 and 23. The bottom plate 21 has a mounting portion 24, a coupling portion 25, and a fixing portion 26. The mounting portion 24, the coupling portion 25, and the fixing portion 26 each have a rectangular plate shape extending in Y-axis direction.

Multiple capacitors 10 are placed on the mounting portion 24. The fixing portion 26 is fixed to the housing 110 of the uninterruptible power supply 100. The coupling portion 25 couples the mounting portion 24 and the fixing portion 26. In plan view in Z-axis direction, the mounting portion 24 and the fixing portion 26 are aligned in X-axis direction. The mounting portion 24 corresponds to one example of a "first mounting portion." The fixing portion 26 corresponds to one example of a "first fixing portion." The coupling portion 25 corresponds to one example of a "first coupling portion."

A first end of the mounting portion 2 in the positive X-axis direction is bonded to the side plate 23. A first end of the fixing portion 26 in the negative X-axis direction is bonded to the side plate 22. A second end of the mounting portion 24 in the negative X-axis direction and a second end of the fixing portion 26 in the positive X-axis direction are connected to each other via the coupling portion 25. The coupling portion 25 is orthogonal to the mounting portion 24 and the fixing portion 26.

This causes the mounting portion 24 to be positioned higher than the fixing portion 26 in Z-axis direction. In other words, the bottom plate 21 is provided with a step between the mounting portion 24 and the fixing portion 26. As the capacitor unit 1 is accommodated within the housing 110, this step causes the space 240 to be formed between the lower surface of the mounting portion 24 and the floor of the housing 110. The space 240 extends in Y-axis direction, functioning as an air passage through which the air introduced into the capacitor unit 1 can flow.

The mounting portion 24 has multiple openings 210 formed therein, passing through the mounting portion 24 in the direction of thickness of the mounting portion 24. As described with respect to FIG. 4, each opening 210, in plan view as viewed from Z-axis direction, is aligned with a gap between adjacent two capacitors 10 in Y-axis direction. With such a configuration, a flow path is formed, as indicated by the arrows in the figure, in which the air, introduced into the capacitor unit 1 through the front surface of the capacitor unit 1, flows through the space 240 into the gap between the two capacitors 10 through each opening 210. This flow of air can facilitate dissipation of heat from a respective capacitor 10.

The side plate 23 has a fixing portion 27, a coupling portion 28, and a connecting portion 29. The fixing portion 27, the coupling portion 28, and the connecting portion 29 each have a rectangular plate shape extending in Y-axis direction. The fixing portion 27 is bonded to the side plate 33 of the base member 30 by fastener members 60 such as rivets. The fixing portion 27 and the side plate 33 have a generally same shape. The plurality of fixation members 70 is mounted on the connecting portion 29, as shown in FIG. 6. The coupling portion 28 connects the fixing portion 27 and the connecting portion 29. The fixing portion 27 corresponds to one example of a "third fixing portion." The connecting portion 29 corresponds to one example of a "connection." The coupling portion 28 corresponds to one example of a "third coupling portion."

The fixing portion 27 is bonded to the first end of the mounting portion 2 in the positive X-axis direction and orthogonal to the mounting portion 24. The fixing portion 27 has multiple through-holes 270 formed therein, passing through the fixing portion 27 in the direction of thickness of the fixing portion 27. The through-holes 270, and the through-holes 330 and 332 (see FIG. 10) formed in the side plate 33 align and are concentrically arranged. Typically, the through-holes 270, 330, and 332 are formed in the same shape.

In plan view from X-axis direction, the fixing portion 27, the coupling portion 28, and the connecting portion 29 are aligned in Z-axis direction. The connecting portion 29 is orthogonal to the mounting portion 24. The connecting portion 29 has the multiple through-holes 290 and 292 formed therein, passing through the connecting portion 29 in the direction of thickness of the connecting portion 29. The through-holes 290 are aligned in Y-axis direction. The through-holes 290 are used to mount to the connecting portion 29 the fixation members 70 on odd rows. The fixation members 70 on odd rows are disposed so that the through-holes 76 in the pair of fin portions 74 align with the through-holes 290. The fixation member 70 is mounted on the connecting portion 29, using fastener members passing through the through-holes 76 and 290.

The through-holes 292 are used to mount to the connecting portion 29 the fixation members 70 on even rows. The fixation members 70 on even rows are disposed so that the through-holes 76 in the pair of fin portions 74 align with the through-holes 292. The fixation member 70 is mounted on the connecting portion 29, using fastener members passing through the through-holes 76 and 292.

A first end of the fixing portion 27 in the positive Z-axis direction and a first end of the connecting portion 29 in the negative Z-axis direction are connected to each other via the coupling portion 28. An obtuse angle is formed between the coupling portion 28 and the fixing portion 27. An obtuse angle is formed between the coupling portion 28 and the connecting portion 29. The angle formed between the coupling portion 28 and the connecting portion 29 is equal to the angle formed between the coupling portion 28 and the fixing portion 27.

This makes the connecting portion 29 different from the fixing portion 27 in position in X-axis direction. The position of the connecting portion 29 in X-axis direction is more to the negative X-axis direction side than the position of the fixing portion 27 in X-axis direction is. The difference between the connecting portion 29 and the fixing portion 27 in position in X-axis direction can be adjusted by adjusting the angle formed between the coupling portion 28 and the fixing portion 27.

Four capacitors 10 are mounted on the bottom plate 21 of the base member 20 so that the side surface of the cylindrical portion 11 is in contact with the connecting portion 29, as shown in FIGS. 4 and 6. Three capacitors 10 are mounted on the bottom plate 31 of the base member 30 so that the side surface of the cylindrical portion 11 is in contact with the side plate 33, as shown in FIGS. 4 and 7. Since the side plate 33 is in area contact with the fixing portion 27, bringing the connecting portion 29 and the side plate 33 into close proximity in X-axis direction allows placement of two capacitors 10 on each row in close proximity in X-axis direction. Depending on a shape of the capacitors 10, however, the lids 12 of two capacitors 10 on each row may collide. In such a case, the collision between the lids 12 of two capacitors 10 on each row can be avoided by placing the connecting portion 29 offset from the fixing portion 27 in the negative X-axis direction to place the connecting portion 29 apart from the side plate 33 in X-axis direction, as shown in FIG. 9.

Note that if there is no chance of collision between the lids 12 of two capacitors 10 on each row, the fixing portion 27 and the connecting portion 29 can be made equal in position in X-axis direction. In other words, the fixing portion 27 and the connecting portion 29 can be made coplanar with each other.

FIG. 10 is a perspective view of the base members 20 and 30 as viewed in the positive X-axis direction. The base member 30 has a bottom plate 31 and side plates 32 and 33. The bottom plate 31 has a mounting portion 34, a coupling portion 35, and a fixing portion 36. The mounting portion 34, the coupling portion 35, and the fixing portion 36 each have a rectangular plate shape extending in Y-axis direction. The mounting portion 34 corresponds to one example of a "second mounting portion." The fixing portion 36 corresponds to one example of a "second fixing portion." The coupling portion 35 corresponds to one example of a "second coupling portion."

As shown in FIGS. 4 and 7, the multiple capacitors 10 are placed on the mounting portion 34. The fixing portion 36 is fixed to the housing 110 of the uninterruptible power supply 100. The coupling portion 35 couples the mounting portion 34 and the fixing portion 36. The mounting portion 34 and the fixing portion 36 are aligned in X-axis direction in plan view in Z-axis direction.

A first end of the mounting portion 34 in the negative X-axis direction is bonded to the side plate 33. A first end of the fixing portion 36 in the positive X-axis direction is bonded to the side plate 32. A second end of the mounting portion 34 in the positive X-axis direction and a second end of the fixing portion 36 in the negative X-axis direction are connected to each other via the coupling portion 35. The coupling portion 35 is orthogonal to the mounting portion 34 and the fixing portion 36.

This causes the mounting portion 34 to be positioned higher than the fixing portion 36 in Z-axis direction. In other words, the bottom plate 31 is provided with a step between the mounting portion 34 and the fixing portion 36. As the capacitor unit 1 is accommodated within the housing 110, this step causes the space 340 to be formed between the lower surface of the mounting portion 34 and the floor of the housing 110. The space 340 extends in Y-axis direction, functioning as an air passage through which the air introduced into the capacitor unit 1 can flow.

The mounting portion 34 has multiple openings 310 formed therein, passing through the mounting portion 34 in the direction of thickness of the mounting portion 34. As described with respect to FIG. 4, each opening 310, in plan view as viewed from Z-axis direction, is aligned with a gap between adjacent two capacitors 10 in Y-axis direction. With such a configuration, a flow path is formed, as indicated by the arrows in the figure, in which the air, introduced into the capacitor unit 1 through the front surface of the capacitor unit 1, flows through the space 340 into the gap between the two capacitors 10 through each opening 310. This flow of air can facilitate dissipation of heat from a respective capacitor 10.

The side plate 33 is bonded to the first end of the mounting portion 34 in the negative X-axis direction and orthogonal to the mounting portion 34. The through-holes 330 and 332 are formed in the side plate 33, passing through the side plate 33 in the direction of thickness of the side plate 33. The through-holes 330 and 332 and the through-holes 270 (see FIG. 9) formed in the fixing portion 27 align and are concentrically arranged. Typically, the through-holes 270, 330, and 332 are formed in the same shape. The through-holes 330 and 332 correspond to one example of a "third through-hole." The through-hole 270 corresponds to one example of a "fourth through-hole."

Multiple through-holes 330 are aligned in Y-axis direction. The through-holes 330 are used to mount to the side plate the fixation members 70 on odd rows. The fixation members 70 on odd rows are disposed so that the through-holes 76 in the pair of fin portions 74 align with the through-holes 330. The fixation member 70 is mounted on the side plate 33, using fastener members passing through the through-holes 76, and 330.

The through-holes 332 are used to mount to the side plate 33 the fixation members 70 on even rows. The fixation members 70 on even rows are disposed so that the through-holes 76 in the pair of fin portions 74 align with the through-holes 332. The fixation member 70 is mounted on the side plate 33, using fastener members passing through the through-holes 76 and 332.

<Advantageous Effects>

As described above, according to the capacitor unit 1 of the present embodiment, multiple capacitors 10 can be densely mounted, while ensuring the workability of a respective capacitor 10. Thus, the capacitor unit 1 having a reduced size can be achieved.

Moreover, by providing steps between the lower surfaces of the bottom plates of the base members 20, 30, and 40 constituting the housing 15, a flow path is formed for the passage of the air introduced into the capacitor unit 1. Furthermore, by forming openings in the bottom plates so as to align with a gap between adjacent two capacitors 10, the air is allowed to flow from the flow path into the gap. This facilitates dissipation of heat from a respective capacitor 10.

The presently disclosed embodiments should be considered in all aspects as illustrative and not restrictive. The scope of the present disclosure is defined by the appended claims, rather than by the description above. All changes which come within the meaning and range of equivalency of the appended claims are to be embraced within their scope.

REFERENCE SIGNS LIST

1 capacitor unit; 2 chopper circuit; 3 to 5 converter unit; 6 control device; 7 breaker unit; 10, C1, C2 capacitor; 11 cylindrical portion; 12 lid; 13 positive terminal; 14 negative terminal; 15 housing; 20, 30, 40 base member; 21, 31, 41 bottom plate; 22, 23, 32, 33, 42, 43 side plate; 24, 34 mounting portion; 25, 28, 35 coupling portion; 50 busbar; 52 insulator; 54 support member; 60 fastener member; 70 fixation member; 72 main part; 74 fin portion; 76, 270, 290, 292, 330, 332 through-hole; 100 uninterruptible power supply; 102 AC power supply; 104 power storage device; 106 load; 110 housing; CB1, CB2 breaker; L1 to L3 reactor; SW switch; CNV converter; and INV inverter.

The invention claimed is:

1. A capacitor unit, comprising:

a plurality of capacitors each having a cylindrical portion extending in a first direction;

a housing on which the plurality of capacitors are mounted; and a plurality of fixation members for fixing the plurality of capacitors to the housing, each of the plurality of fixation members having a main part that has a band shape and mounted to the cylindrical portion, and a pair of fin portions that are bonded to opposing ends of the main part in an extension direction of the main part, wherein the plurality of capacitors include a plurality of first capacitors, the plurality of fixation members include a plurality of first fixation members corresponding to the plurality of first capacitors, the housing includes a first base member on which the plurality of first capacitors are mounted, wherein the first base member includes:

a first bottom plate extending in a second direction orthogonal to the first direction, on which the plurality of first capacitors are aligned in the second direction as an alignment direction; and a first side plate bonded to an end of the first bottom plate in a third direction orthogonal to the first direction and the second direction, the first side plate being arranged upright in the first direction on the first bottom plate, wherein the pair of fin portions of each of the plurality of first fixation members are mounted on the first side plate to fix the plurality of first capacitors to the first base member, wherein on the first side plate, among the plurality of first fixation members, first fixation members on odd rows in the alignment direction are equal in position in the first direction, first fixation members on even rows in the alignment direction are equal in position in the first direction and differ, in position in the first direction, from first fixation members on the odd rows, and fin portions of two first fixation members that are adjacent to each other in the second direction are aligned in the first direction.

2. The capacitor unit according to claim 1, wherein a first gap is formed between two first capacitors that are adjacent to each other in the second direction, the fin portions of the two first fixation members, in plan view as viewed from the third direction, are located at the first gap.

3. The capacitor unit according to claim 2, wherein the first bottom plate has a plurality of first openings formed therein, passing through the first bottom plate in a direction of thickness of the first bottom plate, and the plurality of first openings, in plan view as viewed from the first direction, are aligned with the first gap.

4. The capacitor unit according to claim 1, wherein the first bottom plate includes:

a first mounting portion on which the plurality of first capacitors are placed, the first mounting portion having a rectangular plate shape;

a first fixing portion having a rectangular plate shape; and a first coupling portion connecting the first mounting portion and the first fixing portion, the first coupling portion having a rectangular plate shape, wherein the first mounting portion and the first fixing portion, in plan view as viewed from the first direction, are aligned in the third direction, the first coupling portion is orthogonal to the first mounting portion and the first fixing portion, and the first mounting portion is higher in position in the first direction than the first fixing portion.

5. The capacitor unit according to claim 1, wherein
the plurality of capacitors further include a plurality of second capacitors,
the plurality of fixation members further include a plurality of second fixation members corresponding to the plurality of second capacitors,
the housing further includes a second base member on which the plurality of second capacitors are mounted, wherein
the second base member includes:
a second bottom plate extending in the second direction and on which the plurality of second capacitors are aligned in the second direction as an alignment direction; and
a second side plate bonded to an end of the second bottom plate in the third direction, the second side plate being arranged upright in the first direction on the second bottom plate, wherein
the pair of fin portions of each of the plurality of second fixation members are mounted on the second side plate to fix the plurality of second capacitors to the second base member,
the first side plate and the second side plate are bonded so that a surface of the first side plate, opposite a surface on which the plurality of first fixation members are mounted, and a surface of the second side plate, opposite a surface on which the plurality of second fixation members are mounted, are in area contact, wherein
on the second bottom plate,
among the plurality of second fixation members, second fixation members on the odd rows in the alignment direction are equal in position in the first direction,
second fixation members on the even rows in the alignment direction are equal in position in the first direction and differ, in position in the first direction, from second fixation members on the odd rows,
fin portions of two second fixation members that are adjacent to each other in the second direction are aligned in the first direction, and
the second fixation member and the first fixation member on a same row are equal in position in the second direction and differ from each other in position in the first direction.

6. The capacitor unit according to claim 5, wherein
a second gap is formed between two second capacitors that are adjacent to each other in the second direction,
the fin portions of the two second fixation members, in plan view as viewed from the third direction, are located at the second gap.

7. The capacitor unit according to claim 6, wherein
the second bottom plate has a plurality of second openings formed therein, passing through the second bottom plate in a direction of thickness of the second bottom plate, and
the plurality of second openings, in plan view as viewed from the first direction, are aligned with the second gap.

8. The capacitor unit according to claim 5, wherein
the second bottom plate includes:
a second mounting portion on which the plurality of second capacitors are placed, the second mounting portion having a rectangular plate shape;
a second fixing portion having a rectangular plate shape; and
a second coupling portion connecting the second mounting portion and the second fixing portion, the second coupling portion having a rectangular plate shape, wherein
the second mounting portion and the second fixing portion, in plan view as viewed from the first direction, are aligned in the third direction,
the second coupling portion is orthogonal to the second mounting portion and the second fixing portion, and
the second mounting portion is higher in position in the first direction than the second fixing portion.

9. The capacitor unit according to claim 5, wherein
the first side plate includes:
a third fixing portion bonded to the second side plate, the third fixing portion having a rectangular plate shape;
a connecting portion on which the plurality of first fixation members are mounted, the connecting portion having a rectangular plate shape; and
a third coupling portion connecting the third fixing portion and the connecting portion, the third coupling portion having a rectangular plate shape, wherein
the third fixing portion, the third coupling portion, and the connecting portion, in plan view as viewed from the third direction, are aligned in the first direction, and
an obtuse angle is formed between the third coupling portion and the third fixing portion, an obtuse angle is formed between the third coupling portion and the connecting portion, and the obtuse angle formed between the third coupling portion and the connecting portion and the obtuse angle formed between the third coupling portion and the third fixing portion are equal.

10. The capacitor unit according to claim 9, wherein
the second side plate has a plurality of third through-holes formed therein, passing through the second side plate in a direction of thickness of the second side plate, and
the third fixing portion has a plurality of fourth through-holes formed therein, the plurality of fourth through-holes aligning with the plurality of third through-holes.

11. A power conversion device, comprising:
the capacitor unit according to claim 1;
a plurality of element units; and
a housing for accommodating the capacitor unit and the plurality of element units in stack in the first direction.

12. The capacitor unit according to claim 2, wherein
the plurality of capacitors further include a plurality of second capacitors,
the plurality of fixation members further include a plurality of second fixation members corresponding to the plurality of second capacitors,
the housing further includes a second base member on which the plurality of second capacitors are mounted, wherein
the second base member includes:
a second bottom plate extending in the second direction and on which the plurality of second capacitors are aligned in the second direction as an alignment direction; and
a second side plate bonded to an end of the second bottom plate in the third direction, the second side plate being arranged upright in the first direction on the second bottom plate, wherein
the pair of fin portions of each of the plurality of second fixation members are mounted on the second side plate to fix the plurality of second capacitors to the second base member,
the first side plate and the second side plate are bonded so that a surface of the first side plate, opposite a surface on which the plurality of first fixation members are mounted, and a surface of the second side plate, opposite a surface on which the plurality of second fixation members are mounted, are in area contact, wherein on the second bottom plate, among the plurality of second fixation members, second fixation members on the odd rows in the alignment direction are equal in position in the first direction, second fixation members on the even rows in the alignment direction are equal in position in the first direction and differ, in position in the first direction, from second fixation members on the odd rows, fin portions of two second fixation members that are adjacent to each other in the second direction are aligned in the first direction, and the second fixation member and the first fixation member on a same row are equal in position in the second direction and differ from each other in position in the first direction.

13. The capacitor unit according to claim 3, wherein the plurality of capacitors further include a plurality of second capacitors, the plurality of fixation members further include a plurality of second fixation members corresponding to the plurality of second capacitors, the housing further includes a second base member on which the plurality of second capacitors are mounted, wherein the second base member includes:

a second bottom plate extending in the second direction and on which the plurality of second capacitors are aligned in the second direction as an alignment direction; and a second side plate bonded to an end of the second bottom plate in the third direction, the second side plate being arranged upright in the first direction on the second bottom plate, wherein the pair of fin portions of each of the plurality of second fixation members are mounted on the second side plate to fix the plurality of second capacitors to the second base member, the first side plate and the second side plate are bonded so that a surface of the first side plate, opposite a surface on which the plurality of first fixation members are mounted, and a surface of the second side plate, opposite a surface on which the plurality of second fixation members are mounted, are in area contact, wherein on the second bottom plate, among the plurality of second fixation members, second fixation members on the odd rows in the alignment direction are equal in position in the first direction, second fixation members on the even rows in the alignment direction are equal in position in the first direction and differ, in position in the first direction, from second fixation members on the odd rows, fin portions of two second fixation members that are adjacent to each other in the second direction are aligned in the first direction, and the second fixation member and the first fixation member on a same row are equal in position in the second direction and differ from each other in position in the first direction.

14. The capacitor unit according to claim 4, wherein the plurality of capacitors further include a plurality of second capacitors, the plurality of fixation members further include a plurality of second fixation members corresponding to the plurality of second capacitors, the housing further includes a second base member on which the plurality of second capacitors are mounted, wherein the second base member includes:

a second bottom plate extending in the second direction and on which the plurality of second capacitors are aligned in the second direction as an alignment direction; and a second side plate bonded to an end of the second bottom plate in the third direction, the second side plate being arranged upright in the first direction on the second bottom plate, wherein the pair of fin portions of each of the plurality of second fixation members are mounted on the second side plate to fix the plurality of second capacitors to the second base member, the first side plate and the second side plate are bonded so that a surface of the first side plate, opposite a surface on which the plurality of first fixation members are mounted, and a surface of the second side plate, opposite a surface on which the plurality of second fixation members are mounted, are in area contact, wherein on the second bottom plate, among the plurality of second fixation members, second fixation members on the odd rows in the alignment direction are equal in position in the first direction, second fixation members on the even rows in the alignment direction are equal in position in the first direction and differ, in position in the first direction, from second fixation members on the odd rows, fin portions of two second fixation members that are adjacent to each other in the second direction are aligned in the first direction, and the second fixation member and the first fixation member on a same row are equal in position in the second direction and differ from each other in position in the first direction.

* * * * *